UNITED STATES PATENT OFFICE.

DECATUR D. DENNIS, OF CORPUS CHRISTI, TEXAS.

ANIMAL-TRAP.

1,139,501.  Specification of Letters Patent.  Patented May 18, 1915.

Application filed June 3, 1914. Serial No. 842,668.

*To all whom it may concern:*

Be it known that I, DECATUR D. DENNIS, a citizen of the United States, residing at Corpus Christi, in the county of Nueces and State of Texas, have invented or discovered certain new and useful Improvements in Animal-Traps, of which the following is a specification, reference being had therein to the accompanying drawings.

This invention relates to animal traps, and has for its object to provide a trap which will be simple in construction, which will permit the ready entry of the animal, which will securely hold the animal after its entry, and which will always be set and ready to receive another animal irrespective of how many may have already been caught.

Figure 1:
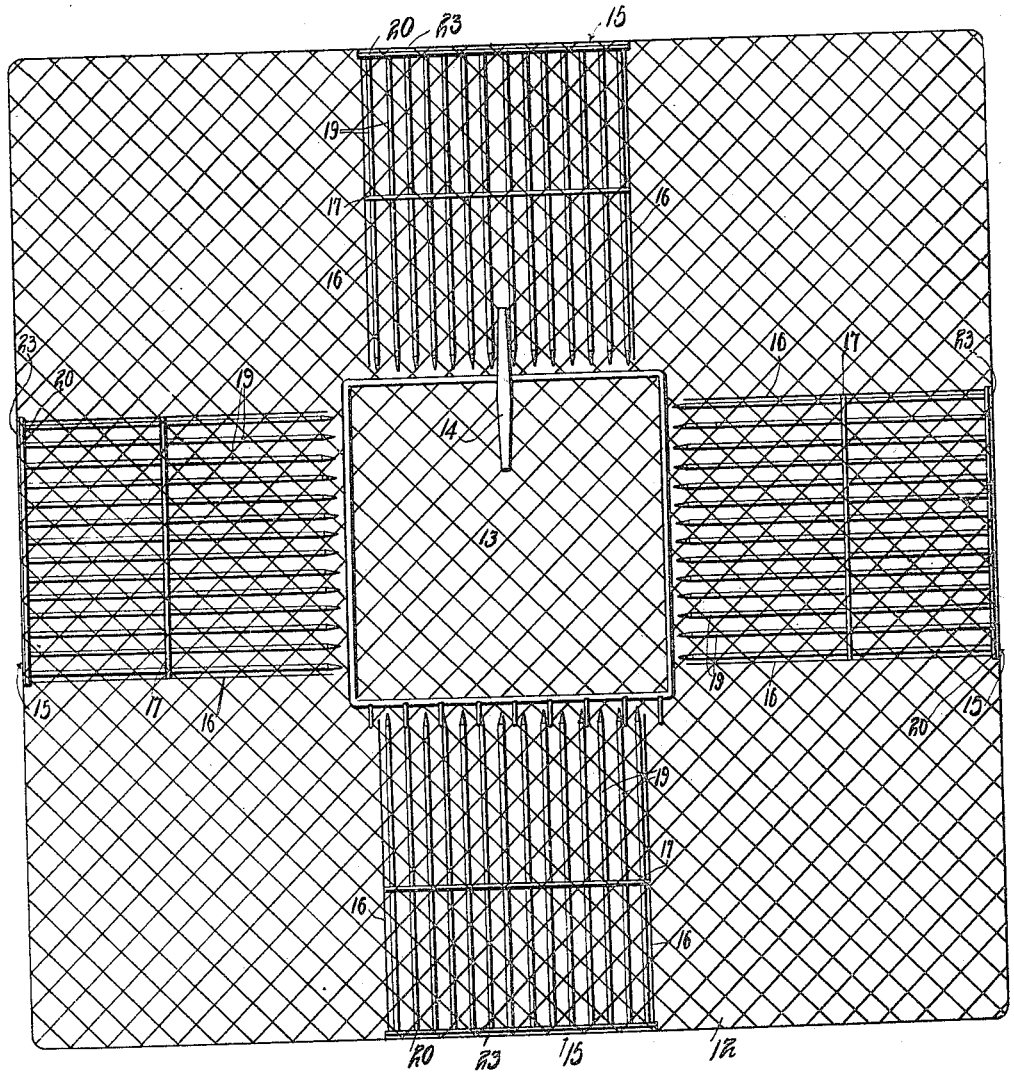
Figure 2:
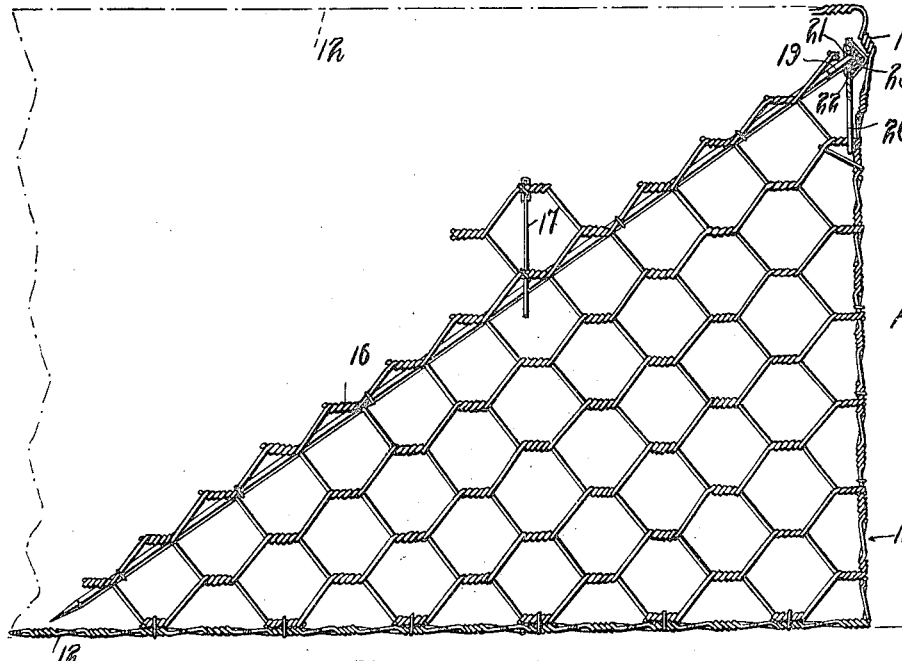
Figure 3:
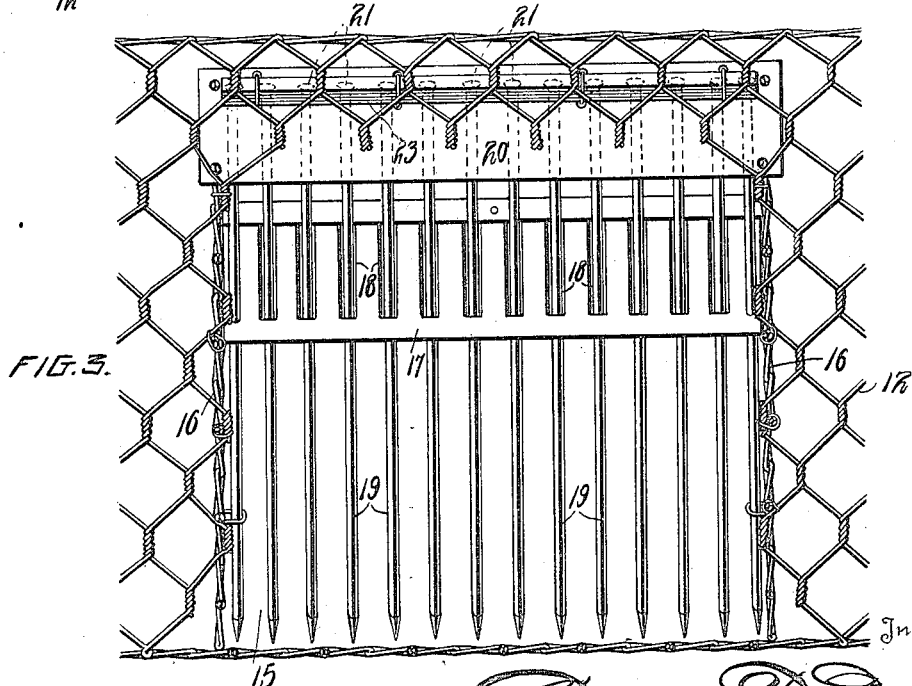

In the accompanying drawings Figure 1 is a plan view illustrating a preferred form of the invention. Fig. 2 is a detail side view of one of the animal entrances, and Fig. 3 a detail end view of the same looking inward.

Referring to the drawings, 12 denotes a wire cage of any suitable size and made in any suitable way, but which will preferably be ordinary poultry netting consisting of wires twisted together in such a manner as to form hexagonal figures. This cage is provided, preferably at its top, with a suitable door 13 which may be simply a section of the wire fabric of which the body of the cage is formed, and which has a hinged connection to the top of the cage by being wired thereto, a suitable latch 14 being provided for securing the door in closed position.

The cage 12 is provided with one or more entrances. In the form of the invention herein shown four entrances, one at each side of the square cage, are provided. At each entrance a section of the wire is cut away to leave an opening, as at 15, and at each side of said opening, and suitably secured to the bottom and the adjacent vertical wall of the cage, preferably by being tied thereto with wires, is a side wall consisting preferably of a triangular section 16 of hexagonal wire netting having at the top thereof, about midway of its length, a complete hexagon to the top and bottom parts of which is attached, preferably by being secured thereto with wires, a finger guide 17 extending between the two side sections and thus connecting them together.

The said finger guide is formed of a piece of sheet metal provided with a series of vertical slots 18 through which extend a series of fingers 19 pointed at their lower ends and having loose or hinged connections at their upper ends with a supporting plate 20 also attached at its ends to the top or outer end parts of the two triangular wire fabric sections 16, thus tying them together and bracing them at their tops. It will thus be understood that the plates 20 and 17 not only serve to support the fingers 19 but also serve to connect the triangular wire fabric side walls 16 of the animal entrance together at two separated points, thus bracing them strongly and securely.

The hinged connections of the fingers 19 with the upper or supporting plate 20 is preferably formed simply by providing the said fingers with heads 21, the parts of said fingers adjacent said heads passing through openings or short vertical slots 22 in the plate 20 so as to permit the said fingers, excepting the two outer ones at the sides, which are fixed, to rise and fall freely. The heads of the said fingers are preferably covered by a small sheet metal trough 23 attached to the plate 20 by means of wires 24, and which trough prevents the endwise displacement of the said fingers in the said plate 20.

From the foregoing it will be apparent that when an animal wishes to enter the cage trap, within or beneath which will be placed a suitable bait, it will naturally creep in under the lower ends of the hinged or pivoted fingers 19 which will lift to permit the entrance of the animal, but which will fall by gravity as soon as the animal is within the cage. Owing to the inclined positions of the fingers 19 and their pointed lower ends, the animal cannot back out from the trap after having once partly entered the same; and owing to the fact that the fingers 19 are guided in their vertical movements by the vertical slots 22 in the finger guide plate 17 the said fingers cannot be displaced sidewise by the efforts of the animal to escape. The construction described affords an entrance portion of a trap which may be manufactured at little cost, and which will be entirely reliable and safe in operation in that, while permitting the ready entrance of an animal to the trap, will absolutely prevent its escape from the trap.

In baiting the trap for rats or similar rodents, the bait may be placed in a small wire cage or similar receptacle located at any suitable position within the trap, but in baiting the trap for coyotes, wild cats, foxes, or larger animals preferably requiring live bait, such as chickens or the like, the bait may be placed in a hole dug in the ground beneath the trap which will be fastened down over the bait. By thus keeping the bait away from the animals to be caught the bait will last a long time, as it will not be devoured, and the trap will thus be continuously set. In baiting for crabs or the like, the bait, such as a piece of meat, may be tied to the bottom of the inside of the trap.

I am aware that it is not new broadly to provide an animal trap with an entrance comprising independently movable fingers which may be lifted by the entering animal, and which will fall by gravity to prevent its escape, and I am also aware that it is not new broadly to make animal traps of hexagonal wire netting, but my invention provides a trap entrance, of the kind referred to, which may be made at little cost and which will be efficient and reliable in use.

Having thus described my invention I claim and desire to secure by Letters Patent:

1. An animal trap consisting of a suitable cage provided with one or more openings to form one or more entrances, each entrance having at its opposite sides, triangular walls formed of hexagonal wire fabric, each triangular side wall having at its top, about midway of its length, an upwardly extending hexagonal support, combined with a finger guide plate provided with a series of vertical slots, said finger guide plate being secured at each end to the top and bottom parts of a top hexagonal support on a side wall, a finger-supporting plate attached to the top parts of said triangular side walls and provided with openings, a series of wire fingers pointed at their lower ends and having enlarged upper ends, said fingers passing through said openings in the said supporting plate, so as to form hinged connections of said fingers with said last-named plate, said fingers also passing through the said vertical slots in said guide plate, and means for preventing endwise displacement of said fingers from said supporting plate.

2. An animal trap consisting of a suitable cage provided with one or more openings to form one or more entrances, each entrance having at its opposite sides triangular walls formed of hexagonal wire fabric, each triangular side wall having at its top, about midway of its length, an upwardly extending hexagonal support, combined with a finger guide plate provided with a series of vertical slots, said finger guide plate being secured at each end to the top and bottom parts of a top hexagonal support on a side wall, a finger-supporting plate attached to the top parts of said triangular side walls and provided with openings, a series of wire fingers pointed at their lower ends and having enlarged upper ends, said fingers passing through said openings in the said supporting plate, so as to form hinged connections of said fingers with said last-named plate, said fingers also passing through the said vertical slots in said guide plate, and means for preventing endwise displacement of said fingers from said supporting plate, said means consisting of an inverted trough attached to said finger-supporting plate and covering the enlarged upper ends of said fingers.

3. An animal trap consisting of a suitable cage provided with one or more openings to form one or more entrances, each entrance having, at its opposite sides, walls formed of hexagonal wire fabric, each side wall having at its top, about midway of its length, an upwardly extending hexagonal support, combined with a finger guide plate provided with a series of vertical slots, said finger guide being secured at each end to the top and bottom parts of a hexagonal support on a side wall, a finger-supporting plate attached to the outer end parts of said side walls and provided with openings, a series of wire fingers pointed at their lower ends and having hinged connections with said supporting plate, said fingers passing through the said vertical slots in said guide plate, and means for preventing endwise displacement of said fingers from said supporting plate.

In testimony whereof I affix my signature, in presence of two witnesses.

DECATUR D. DENNIS.

Witnesses:
 GORDON BOONE,
 ARTHUR STARR.

Copies of this patent may be obtained for five cents each, by addressing the "Commissioner of Patents, Washington, D. C."